(12) United States Patent
Yamano et al.

(10) Patent No.: US 10,401,986 B2
(45) Date of Patent: Sep. 3, 2019

(54) POINTER

(71) Applicants: SEIKO EPSON CORPORATION, Tokyo (JP); MURATA MANUFACTURING CO., LTD., Nagaokakyo-shi, Kyoto (JP)

(72) Inventors: Daigo Yamano, Matsumoto (JP); Shingo Wakimoto, Azumino (JP); Takashi Kihara, Kyoto (JP); Masamichi Ando, Kyoto (JP); Hiroaki Kitada, Kyoto (JP); Jun Endo, Kyoto (JP); Yoshihiro Yamaguchi, Kyoto (JP)

(73) Assignees: SEIKO EPSON CORPORATION, Tokyo (JP); MURATA MANUFACTURING CO., LTD., Nagaokakyo-shi (JP)

(*) Notice: Subject to any disclaimer, the term of this patent is extended or adjusted under 35 U.S.C. 154(b) by 294 days.

(21) Appl. No.: 15/452,237

(22) Filed: Mar. 7, 2017

(65) Prior Publication Data
US 2017/0269717 A1 Sep. 21, 2017

(30) Foreign Application Priority Data

Mar. 16, 2016 (JP) .................................. 2016-052039

(51) Int. Cl.
*G06F 3/038* (2013.01)
*G06F 3/033* (2013.01)
*G06F 3/0354* (2013.01)

(52) U.S. Cl.
CPC ............ *G06F 3/0386* (2013.01); *G06F 3/033* (2013.01); *G06F 3/03542* (2013.01)

(58) Field of Classification Search
CPC .. G06F 3/033; G06F 3/03542; G06F 3/03545; G06F 3/0386
See application file for complete search history.

(56) References Cited

U.S. PATENT DOCUMENTS 4,513,437 A * 4/1985 Chainer ................... B43K 8/22
382/120
9,552,049 B1 * 1/2017 Butler .................... G06F 1/3259
(Continued)

FOREIGN PATENT DOCUMENTS

WO 2013/114453 A1 8/2013

OTHER PUBLICATIONS

U.S. Appl. No. 62/215,620, filed Sep. 2015, Zimmerman; Aidan N.*

*Primary Examiner* — Priyank J Shah
(74) *Attorney, Agent, or Firm* — Oliff PLC

(57) ABSTRACT

A pointer includes: a pointer tip having a tip configured to point a position; a transmitter configured to emit a signal from the pointer tip; and a main body connected to the pointer tip. The main body includes: an exterior housing forming an exterior; a detector configured to detect displacement of the exterior housing and output a detection signal; and a controller configured to change an operation state of the pointer in accordance with the detection signal. The detector includes: a detection device provided on an inner surface of the exterior housing and configured to detect the displacement; and a signal outputter configured to output the detection signal in the case where the detection device detects the displacement.

13 Claims, 8 Drawing Sheets

(56) References Cited

U.S. PATENT DOCUMENTS

| | | | |
|---|---|---|---|
| 2014/0204059 A1* | 7/2014 | Geaghan | G06F 3/0416 |
| | | | 345/174 |
| 2014/0253463 A1* | 9/2014 | Hicks | G06F 3/03545 |
| | | | 345/173 |
| 2014/0253522 A1* | 9/2014 | Cueto | G06F 3/03545 |
| | | | 345/179 |
| 2014/0267184 A1* | 9/2014 | Bathiche | G06F 3/03545 |
| | | | 345/179 |
| 2014/0333590 A1 | 11/2014 | Hirata et al. | |
| 2017/0052610 A1* | 2/2017 | Large | G06F 3/03545 |
| 2017/0068342 A1* | 3/2017 | Zimmerman | G06F 3/0383 |
| 2018/0026175 A1* | 1/2018 | Kihara | G06F 3/03 |
| | | | 310/314 |
| 2018/0058954 A1* | 3/2018 | Kihara | G01L 1/16 |

\* cited by examiner

POINTER

CROSS-REFERENCE TO RELATED APPLICATION

This application claims priority from Japanese Patent Application No. 2016-052039 filed on Mar. 16, 2016, the contents of which are incorporated herein by reference.

BACKGROUND

1. Technical Field

The present invention relates to a pointer.

2. Related Art

Conventionally, a system is known which includes: a projector projecting an image on a projection surface such as a white board; and a pointer such as an electronic pen used in operation on the projection surface thereof (for example, PCT International Publication No. WO13/114453, hereinafter, referred to as Patent Document 1).

In the system using the foregoing pointer, when a user operates the pointer on the projection surface (operation surface), the pointer emits a signal such as infrared light from the tip thereof.

The projector is configured to detect the signal emitted from the pointer and project, for example, an information image on the projection surface so as to overlap an information image associated with the trajectory of the signal emitted from the pointer.

The electronic pen disclosed in Patent Document 1 includes a light-emitter, a pen tip, a pressure-sensitive sensor, a controller, a holding mechanism holding the pressure-sensitive sensor, and an external switch.

The electronic pen is configured to constantly apply a predetermined pressure to a pressure-sensitive sensor, and when the pen tip is pressed and the pressure is not applied thereto, the electronic pen determines that the pen tip comes into contact with a writing surface.

Regarding the operation by use of the pointer, a pointing operation or the like may be carried out while not pressing the pen tip, in addition to an operation that is carried out by pressing the pen tip (pointing operation or drawing operation).

However, since the electronic pen disclosed in Patent Document 1 cannot accurately determine whether or not the electronic pen is being used and whether or not the above-described operations are carried out, it is not possible to easily switch to a low power consumption mode.

If it is switched to the low power consumption mode even though the electronic pen is being used, since the time is required until the electronic pen returns and drawing or the like is possible, the operatability of the electronic pen is degraded.

Consequently, there is a problem in that it is difficult to reduce power consumption in the electronic pen disclosed in Patent Document 1.

SUMMARY

An aspect of the invention provides a pointer including: a pointer tip having a tip configured to point a position; a transmitter configured to emit a signal from the pointer tip; and a main body connected to the pointer tip. The main body includes: an exterior housing forming an exterior, a detector configured to detect displacement of the exterior housing and output a detection signal, and a controller configured to change an operation state of the pointer in accordance with the detection signal. The detector includes: a detection device provided on an inner surface of the exterior housing and configured to detect the displacement, and a signal outputter configured to output the detection signal in the case where the detection device detects the displacement.

With this configuration, since the pointer includes the transmitter configured to emit a signal from the pointer tip, it is possible to carry out pointing operation or drawing operation by detecting the signal emitted from the transmitter.

The pointer includes: the detection device provided on the inner surface of the exterior housing; and the signal outputter configured to carry out determination of output from the detection device and outputs a detection signal.

Therefore, the pointer can be configured so that, when a user holds the pointer, the position of the detection device is changed, and a detection signal is output from the signal outputter.

The pointer includes the controller configured to change an operation state of the pointer in accordance with the detection signal from the detector.

Consequently, since the pointer can detect a holding state of being held by the user and can determine whether or not it is in a leaving state where the pointer is not held by the user and is left, it is possible to change an operation state corresponding to the holding state or the leaving state.

For example, in the case where a leaving state continues for a predetermined time, since it is possible to determine that the pointer is not reliably being used, it is possible to change an operation state to a low power consumption state. In addition, in the low power consumption state, when the user holds the pointer (holding state), it is possible to change a state of the pointer to a predetermined state without carrying out another operation.

Accordingly, it is possible to provide the pointer that can reduce power consumption and improve the operatability thereof.

In the pointer according to the above-described aspect, it is preferable that the exterior housing include a housing body that extends in a first direction from the tip to an opposite side of the tip and surrounds the detector as seen in the first direction, and that the detection device be arranged on an inner surface of the housing body in a circumferential direction of the housing body.

With this configuration, since the pointer includes the above-described housing body, the user can hold the housing body and use the pointer like a writing instrument.

Furthermore, since the detection device is provided inside the housing body which is easily held by the user, it is possible to effectively transmit the user's force for holding the pointer to the detection device.

Accordingly, the pointer can effectively detect the holding state.

In the pointer according to the above-described aspect, it is preferable that the housing body include a first housing and a second housing which are arranged adjacent to each other in the circumferential direction, and that the detection device be provided so as to overlap the first housing and the second housing.

With this configuration, since the detection device is provided so as to overlap the first housing and the second housing, the housing body effectively bends due to the holding of the pointer by the user, and it is possible to effectively transmit the displacement in accordance with the flexure to the detection device.

Accordingly, the holding state is effectively detected, and it is possible to provide the pointer that changes an operation state.

In the pointer according to the above-described aspect, it is preferable that the housing body include a third housing that is arranged adjacent to the second housing on an opposite side of the first housing in the circumferential direction, and that the detection device be provided so as to overlap the second housing and the third housing.

With this configuration, the detection device is provided so as to overlap the second housing and the third housing as well as overlap the first housing and the second housing.

Consequently, when the user bends the housing body, since the position in the circumferential direction of the pointer which is held by the user is not limited, it is possible to further improve the operatability of the pointer.

In the pointer according to the above-described aspect, it is preferable that the first housing, the second housing, and the third housing be annularly arranged in the circumferential direction, and that at least one of a display that is configured to display information associated with the pointer, and an operation unit that is to be operated by a user, be arranged in the second housing.

With this configuration, the first housing, the second housing, and the third housing are annularly arranged in the circumferential direction, and the first housing and the third housing are arranged adjacent to both sides of the second housing.

Furthermore, at least one of the display and the operation unit is disposed on the second housing.

For this reason, it is possible to allow the user to hold the first housing and the third housing.

Since the detection device is provided so as to overlap the first housing and the second housing and so as to overlap the second housing and the third housing, it is possible to allow the user to hold the portion at which the housing body effectively bends.

Accordingly, the housing body effectively bends, and it is possible to effectively transmit the displacement in accordance with the flexure to the detection device.

In the pointer according to the above-described aspect, it is preferable that the detection device be provided in a region having degrees greater than 180° along the circumferential direction with respect to a central axis of the pointer.

With this configuration, the detection device is provided in the above-mentioned region having degrees greater than 180°.

Since it is thought that the user holds the portions facing each other of the housing body in the circumferential direction, it is possible to reliably transmit, to the detection device, the displacement due to the flexure of the exterior housing.

In the pointer according to the above-described aspect, it is preferable that the pointer have three regions which are obtained by dividing the pointer into three equal parts in the first direction, and that the detection device be provided in a center region of the three regions.

With this configuration, since the detection device is located at the above-described center region, it is possible to detect a holding state in the case where the user holds the center portion and in the case where the user holds one side region of the center portion and the other side region of the center portion.

Accordingly, it is possible to provide the pointer that changes an operation state and improves flexibility in the position at which the user holds the pointer in the first direction.

It is preferable that the pointer according to the above-described aspect further include: an elastic member stacked on a surface of the detection device which is on an opposite side of the inner surface of the exterior housing; and a support frame configured to support the elastic member on an opposite side of the detection device.

With this configuration, the elastic member and the support frame are provided in this order on the surface of the detection device on the opposite side of the inner surface of the exterior housing.

Because of this, a state is maintained in which the detection device is located along the inner surface of the exterior housing, and it is possible to change the position of the detection device as a consequence of the flexure of the exterior housing.

Accordingly, it is possible to realize the arrangement of the detection device which sensitively detects the displacement in accordance with the flexure of the exterior housing.

It is preferable that the pointer according to the above-described aspect further include: a driver configured to drive the transmitter. The pointer preferably includes: an operating mode of enabling the driver to drive by the controller, and a first stand-by mode of stopping operation of the driver by the controller.

With this configuration, since the pointer includes the first stand-by mode of stopping operation of the driver, it is possible to reduce power consumption.

In the pointer according to the above-described aspect, it is preferable that, in the case where the detection signal is output in the first stand-by mode, the controller change the first stand-by mode to the operating mode.

With this configuration, when the user holds the pointer in the first stand-by mode, the pointer can turn into the operating mode without carrying out other operation.

Accordingly, it is possible to provide a pointer that can realize improvement in operatability and can shorten the time until the pointer can carry out a drawing operation or the like.

In the pointer according to the above-described aspect, it is preferable that, in the case where a state where the detection signal is not output continues for a first predetermined time in the operating mode, the controller change the operating mode to the first stand-by mode.

With this configuration, in the case where the pointer is not held for the first predetermined time in the operating mode (that is, in the case where the pointer is in the leaving state), the pointer turns into the first stand-by mode.

Since the first stand-by mode stops the operation of the driver, it is possible to reduce consumed power of the pointer.

The pointer can detect that the pointer is held by the user without carrying out a specified operation.

Particularly, the pointer can detect a state where the pointer is not being reliably used, and in the case where the time for which the pointer is not being reliably used reaches the first predetermined time, the pointer turns into first stand-by mode.

Accordingly, even where the first predetermined time is shortened, it is possible to prevent the operatability of the pointer from being degraded.

Accordingly, it is possible to further reduce power consumption of the pointer.

In the pointer according to the above-described aspect, it is preferable that the pointer include a second stand-by mode of stopping part of the operation carried out in the first stand-by mode by the controller.

With this configuration, since the pointer includes the aforementioned second stand-by mode, it is possible to further reduce power consumption.

In the pointer according to the above-described aspect, it is preferable that, in the case where a state where the detection signal is not output continues for a second predetermined time in the first stand-by mode, the controller change the first stand-by mode to the second stand-by mode.

With this configuration, in the case where the pointer is not held for the second predetermined time in the first stand-by mode (that is, in the case where the pointer is in the leaving state), the pointer turns into the second stand-by mode.

As described above, since the pointer can detect a state where the pointer is not being reliably used, even where the second predetermined time is shortened, it is possible to prevent the operatability of the pointer from being degraded.

Accordingly, it is possible to further reduce power consumption of the pointer.

In the pointer according to the above-described aspect, it is preferable that, in the case where the detection signal is output in the second stand-by mode, the controller change the second stand-by mode to the operating mode.

With this configuration, when the user holds the pointer in the second stand-by mode, the pointer can turn into the operating mode without carrying out other operation.

Accordingly, it is possible to provide the pointer that can realize improvement in operatability and can shorten the time until the pointer can carry out a drawing operation or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a pointer according to an embodiment will be described with reference to drawings.

Figure 1:
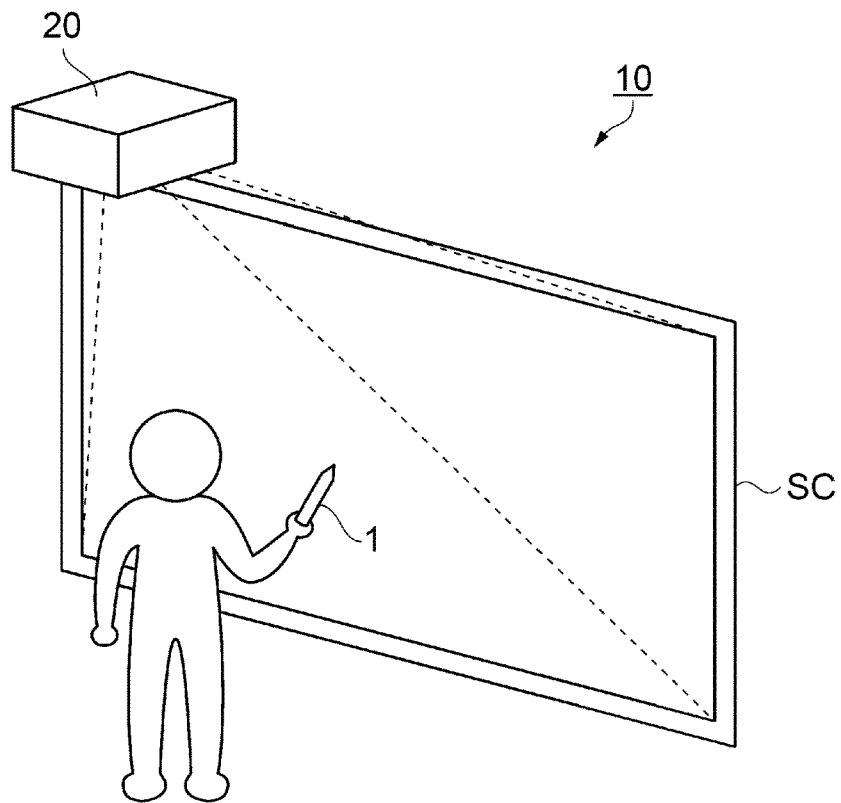
FIG. 1 is a schematic view showing a configuration of a display system using a pointer according to an embodiment.

FIG. 1 is a schematic view showing a configuration of a display system 10 using the pointer 1 according to the embodiment.

The display system 10 includes a pointer 1 and a projector 20 and is configured to be able to point a position on an image that is projected onto a projection surface SC such as a white board by the projector 20 and draw a graphic, characters, or the like in accordance with operation of the pointer 1 by the user.

The projector 20 includes: an image projector that is configured to project an image in accordance with image information that is input to the projector 20 on the projection surface SC; and an image capturer that is configured to capture the projection surface SC as an image. A detailed explanation regarding the projector is omitted here.

The projector 20 is configured to detect a light signal emitted from the pointer 1 used in operation on the projection surface SC (operation surface), analyze the position from which the signal is emitted based on the detected information, project a superimposed image on which a line representing a trajectory of the position is superimposed on the image information onto the projection surface SC, change the image to be projected, or the like.

(Main Configuration of Pointer)

Figure 2:
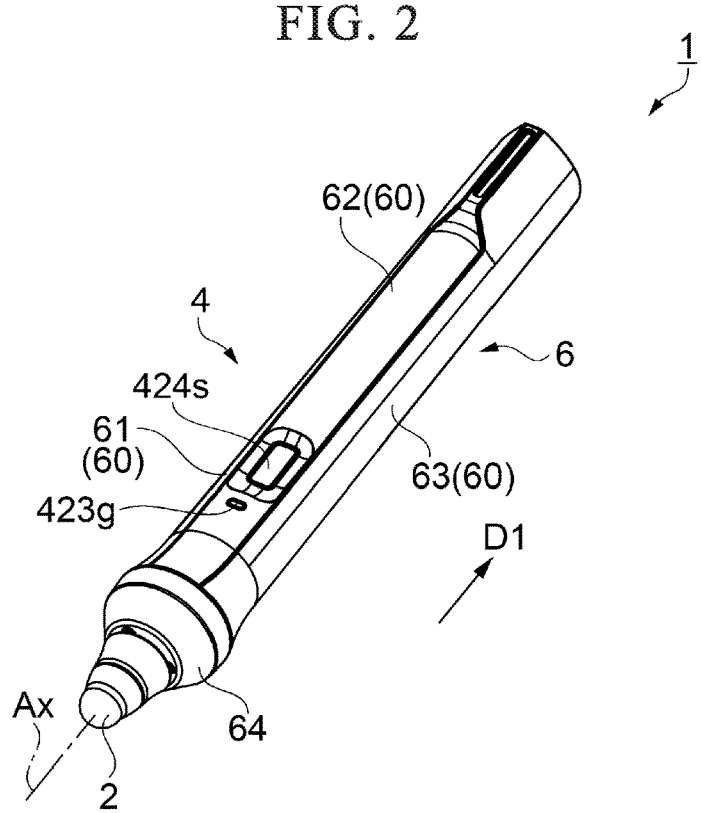
FIG. 2 is a perspective view showing an external appearance of the pointer according to the embodiment.

FIG. 2 is a perspective view showing an external appearance of the pointer 1.

Figure 3:
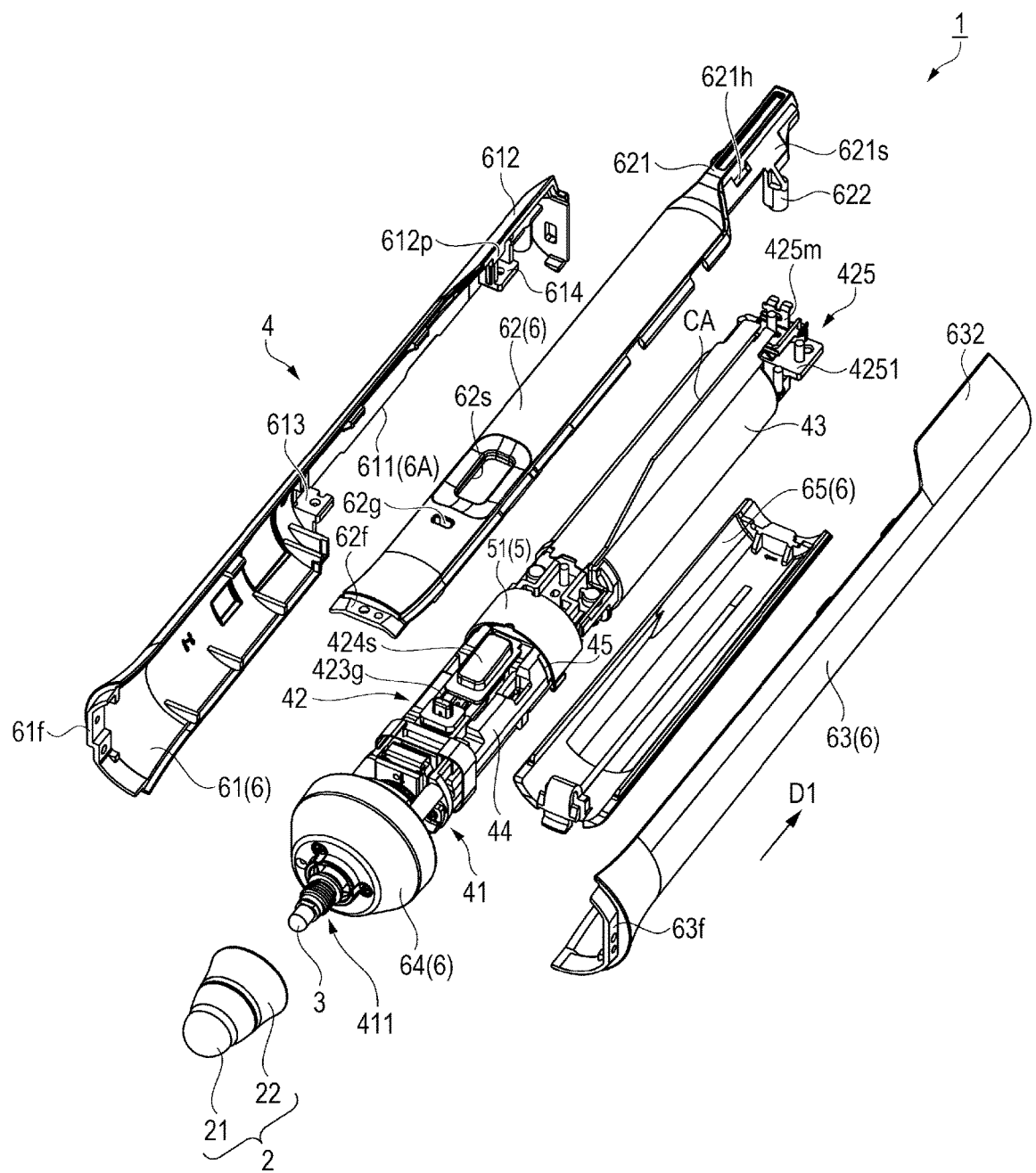
FIG. 3 is an exploded perspective view showing the pointer according to the embodiment.

FIG. 3 is an exploded perspective view showing the pointer 1.

As shown in FIG. 2, the pointer 1 has a shape similar to that of a writing instrument, includes a tip that points a position on the projection surface SC, and extends in a first direction D1 from the tip to the opposite side of the tip.

As shown in FIG. 3, the pointer 1 includes: a pointer tip 2 having a tip; a light emitter 3 that is provided in the pointer tip 2 and serves as a transmitter; and a main body 4 connected to the pointer tip 2.

As shown in FIG. 3, the pointer tip 2 includes: a transmission member 21 that forms a tip of the pointer 1; and a light shielding member 22 located at the position of the transmission member 21 which is close to the main body 4.

The transmission member 21 is formed of a member that allows light emitted from the light emitter 3 to transmit therethrough. The light shielding member 22 is formed of a member that shields light emitted from the light emitter 3.

A hollow portion which is not shown in figure is provided in the pointer tip 2 and opens at the opposite side of the tip, and a thread groove is formed on an inner surface of the hollow portion.

The pointer 1 according to the embodiment is formed so that the central axis Ax of the pointer tip 2 (refer to FIG. 2) is substantially the same direction as the first direction D1.

An LED (Light Emitting Diode) that emits infrared light is used as the light emitter 3.

The light emitter 3 protrudes from the main body 4 toward the pointer tip 2 and is disposed in the hollow portion of the pointer tip 2.

That is, the light emitter 3 emits a light signal from the pointer tip 2.

The light emitter 3 has directionality and emits light in a direction along the central axis Ax as a center.

Particularly, in the above configuration, the central axis Ax of the pointer tip 2 is the central axis of the light emitted from the light emitter 3.

The main body 4 supports the pointer tip 2 so that the position of the pointer tip 2 can be changed.

The change of the position of the pointer tip 2 (displacement of the pointer tip 2) means inclination with respect to the central axis Ax of the pointer tip 2 or movement toward the main body 4 along the central axis Ax.

That is, the pointer 1 is configured to be able to operate not only in a state where the pointer 1 is positioned at a substantially right angle with respect to the projection surface SC but also in a state where the pointer 1 is inclined with respect to the projection surface SC.

The main body 4 detects that the tip of the pointer tip 2 is pressed due to the displacement of the pointer tip 2 and causes the light emitter 3 to emit a light signal (first emitting optical pattern) indicating the pointing position on the projection surface SC.

Figure 4:
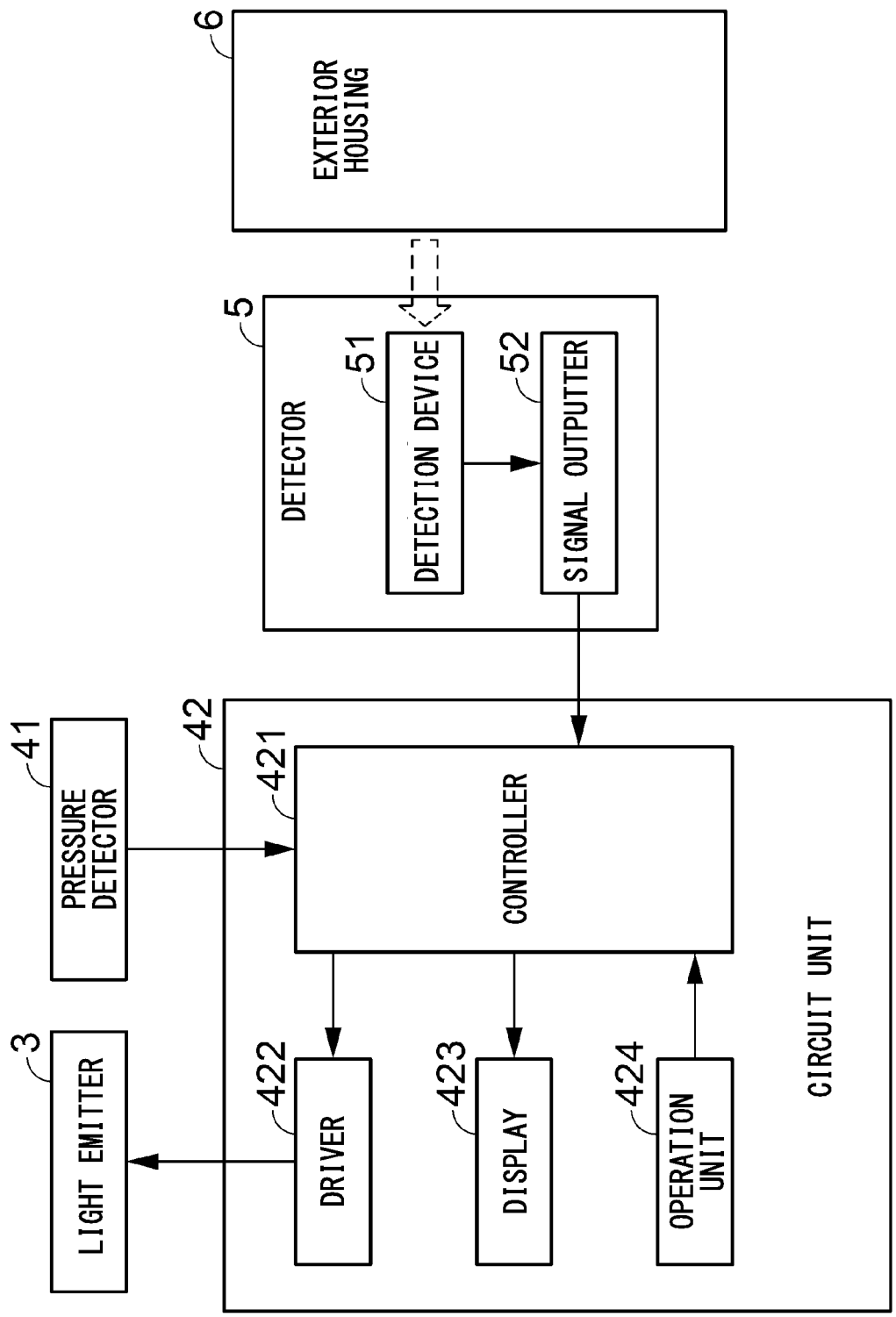
FIG. 4 is a block diagram showing a configuration of a circuit unit and a detector according to the embodiment.

As shown in FIG. 4, the main body 4 includes: a detector 5 that is configured to detect displacement (change in position) in accordance with the amount of flexure of an exterior housing 6 which will be described later; and a controller 421. The main body 4 is configured to able to change an operation state of the pointer 1 in accordance with the detection signal detected by the detector 5.

(Configuration of Main Body)

Here, the main body 4 will be particularly described.

As shown in FIG. 3, the main body 4 includes a pressure detector 41, a circuit unit 42, a battery 43, the detector 5, a support frame 44, an elastic member 45, and the exterior housing 6 that accommodates these members thereinside and forms an exterior.

As shown in FIG. 3, the pressure detector 41 includes a connection member 411 connected to the pointer tip 2, an electrical connection member, or the like and serves as a switch. A detailed explanation regarding the pressure detector is omitted here.

As shown in FIG. 3, the connection member 411 has a cylindrical portion that protrudes toward the pointer tip 2, and a thread groove is formed on an outer peripheral face of the cylindrical portion.

In connection member 411, the opposite side of the thread groove and the electrical connection member are disposed in the exterior housing 6.

The light emitter 3 is exposed at the connection member 411, and a lead terminal is inserted into the inside of the connection member 411 and is maintained by the connection member 411.

The lead terminal that is inserted into the inside of the connection member 411 is connected to the circuit unit 42.

As the thread groove (not shown in figure) formed on the inner surface of the hollow portion is screwed to the thread groove of the connection member 411, the pointer tip 2 is connected to the connection member 411.

When the pointer tip 2 is pressed in operation of the pointer 1 on the projection surface SC, the positions of the light emitter 3 and the connection member 411 as well as the position of the pointer tip 2 are changed.

When the pointer tip 2 is pressed and therefore the position of the connection member 411 is changed, a connected state of the electrical connection member is changed, and the pressure detector 41 detects that the pointer tip 2 is pressed.

FIG. 4 is a block diagram showing a configuration of the circuit unit 42 and the detector 5.

The circuit unit 42 is configured to include a circuit device and a circuit substrate into which the circuit device is packaged. As shown in FIG. 4, the circuit unit 42 includes the controller 421, a driver 422 that drives the light emitter 3, a display 423, an operation unit 424. As shown in FIG. 3, the circuit unit 42 includes a connector 425 used to electrically connect the battery 43.

The controller 421 includes a CPU (Central Processing Unit) or the like and is configured to carry out various control of the pointer 1.

The controller 421 changes an operation state such that, for example, the controller 421 controls the driver 422, or the controller 421 turns on the power of the pointer 1 based on a detection signal output from the detector 5.

In a state where the power of the pointer 1 is turned on, the pointer 1 has an operating mode, a first stand-by mode, and a second stand-by mode.

The controller 421 enables the driver 422 to drive in the operating mode, stops operation of the driver 422 in the first stand-by mode, and stops part of the operation carried out by the first stand-by mode in the second stand-by mode.

Specifically, in the second stand-by mode, the controller 421 receives a detection signal from the detector 5 and stops operation other than that of a receiver (not shown in figure) that switches a mode to the operating mode.

That is, in the second stand-by mode, the controller 421 stops not only the operation of the driver 422 but also the operations related to the pressure detector 41, the display 423, and the operation unit 424.

When the pointer tip 2 is pressed in the operating mode, the controller 421 causes the light emitter 3 to constantly emit light in a first emitting optical pattern. When the pointer tip 2 is not pressed, the controller 421 causes the light emitter 3 to normally emit light in a second emitting optical pattern of a light signal which is different from that of the first emitting optical pattern.

Accordingly, the projector 20 can determine whether or not the pointer tip 2 of the pointer 1 is pressed and can detect a position of the pointer 1 even in the case when the pointer tip 2 is not pressed.

The display 423 is configured to display information associated with the pointer 1 and the display 423 according to the embodiment displays a state of the remaining capacity of the battery 43.

The display 423 includes: a LED (not shown in figure) mounted on the circuit substrate; and a light guide 423g that guides light emitted from the LED (refer to FIG. 3).

As shown in FIG. 2, the light guide 423g is disposed and exposed at an opening formed on the exterior housing 6.

In accordance with command from the controller 421, the display 423 displays a state of the remaining capacity of the battery 43 by varying a lighting state of light such as a color of light emitted from the LED, lighting, blinking, or extinguishing of light.

Hereinbelow, for convenience in explanation, the tip of the pointer 1 is referred to as the front side, the opposite side of the tip is referred to as the back side, the position at which the display 423 is located is referred to as the upper side, and the opposite side of the upper side is referred to as the lower side.

The operation unit 424 is operated by a user, and the operation unit 424 according to the embodiment is a push-type switch provided on the pointer 1 and switch function of, for example, drawing a graphic, characters, or the like.

As shown in FIG. 3, the operation unit 424 includes an operation button 424s provided at the back side of the light guide 423g. As shown in FIG. 2, the operation button 424s is disposed and exposed at the opening formed on the exterior housing 6.

The battery 43 is located at the back side of the main body 4 and supplies electric power the light emitter 3 and the circuit unit 42.

The battery 43 according to the embodiment is one AA size battery and is disposed so that the negative terminal thereof is located at the back side.

As shown in FIG. 3, the connector 425 includes a negative terminal 425m to be connected to the negative terminal of the battery 43, a cable CA, and a holder 4251.

The negative terminal 425m is made of a sheet metal and disposed close to the back side of the pointer 1. A detailed explanation regarding the negative terminal is omitted here.

The negative terminal 425m has a contact portion to be in contact with the negative terminal of the battery 43 and a bending portion bending from the contact portion, and is connected to a circuit substrate of the circuit unit 42 via the cable CA.

The holder 4251 is made of a synthetic resin material, a screw insertion hole through which a screw is to be inserted.

The negative terminal 425m is held between the exterior housing 6 and the holder 4251, a screw is inserted through the screw insertion hole of the holder 4251, and the negative terminal 425m is thereby fixed to the exterior housing 6.

Particularly, a positive terminal (not shown in figure) to be connected to a positive terminal of the battery 43 is packaged into a circuit substrate of the circuit unit 42.

Figure 5:
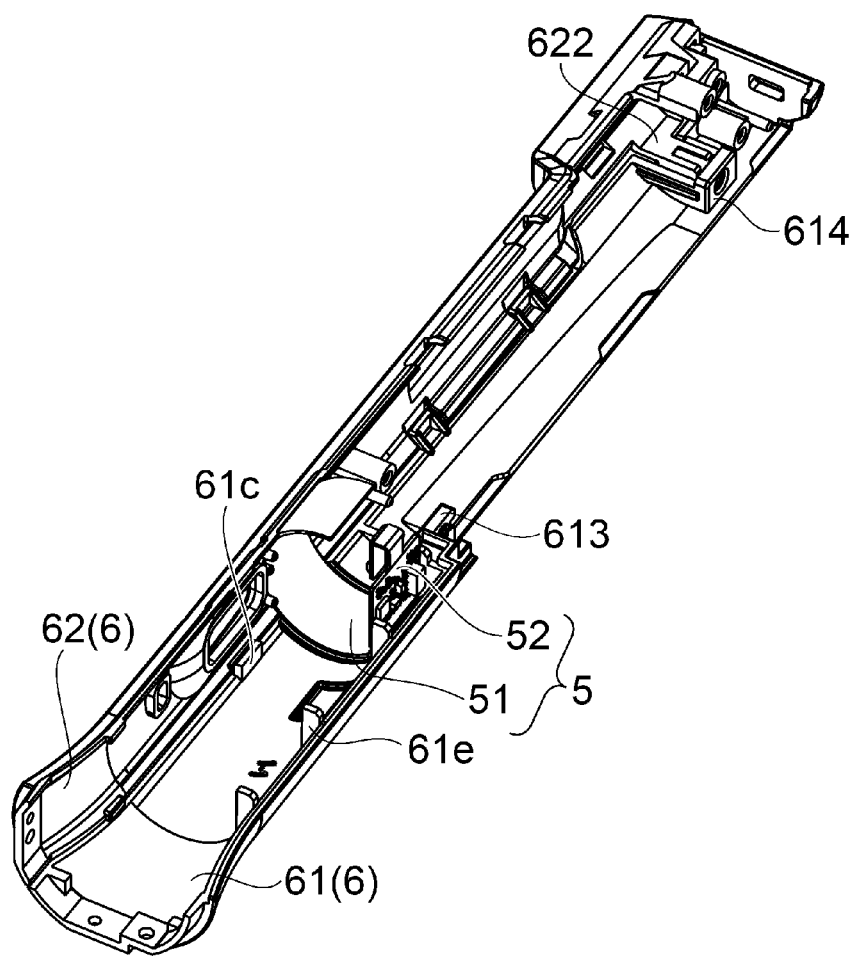
FIG. 5 is a perspective view showing a part of an exterior housing and the detector according to the embodiment.

FIG. 5 is a perspective view showing part of the exterior housing 6 (a first housing 61 and a second housing 62 which will be described later), and the detector 5.

The detector 5 detects displacement in accordance with the amount of flexure of the exterior housing 6 and outputs a detection signal.

The detector 5 is disposed between the battery 43 and the operation button 424s in the first direction D1 as shown in FIG. 3 and includes a detection device 51 and a signal outputter 52 as shown in FIG. 5.

Figure 6:
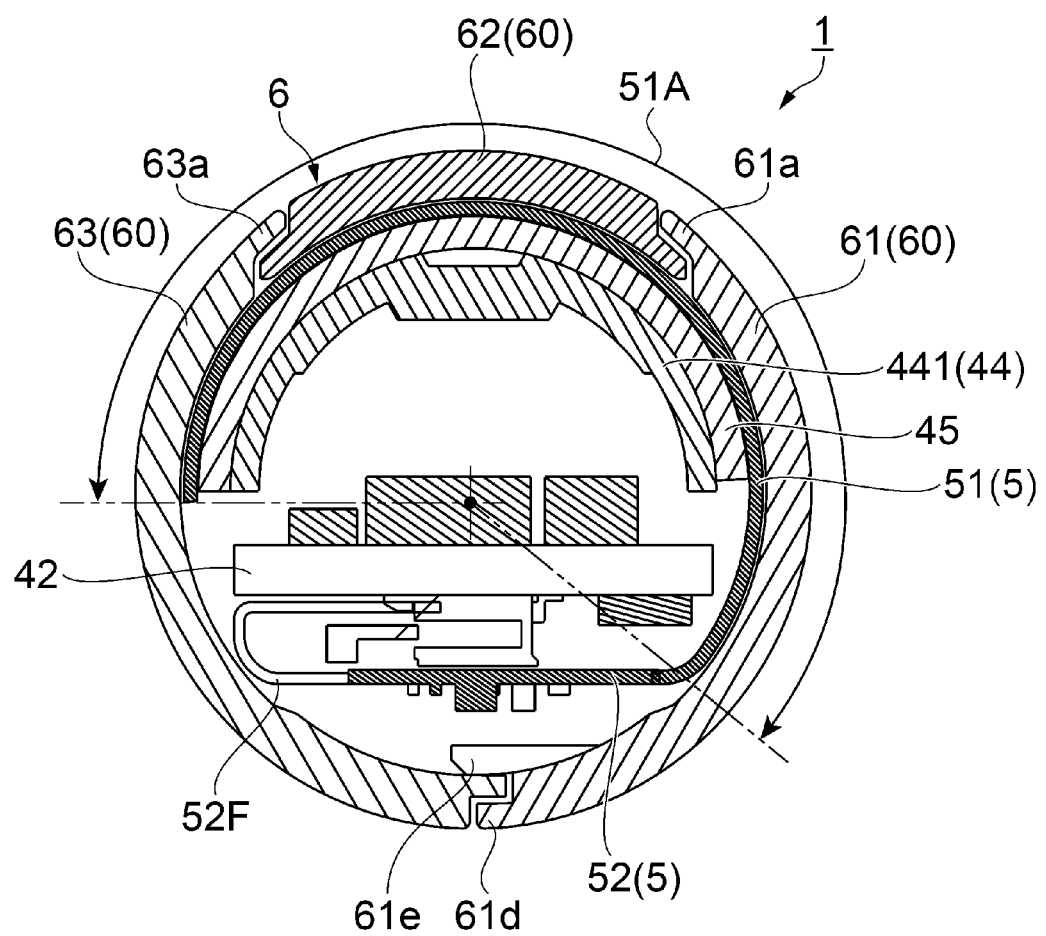
FIG. 6 is a cross-sectional view showing the pointer according to the embodiment.

FIG. 6 is a cross-sectional view showing the pointer 1 and is a view showing the portion at which the detector 5 is disposed as seen from the back side of the pointer 1.

As shown in FIG. 6, the exterior housing 6 has an inner surface formed in a circular shape at the portion at which the detector 5 is disposed.

The detection device 51 includes a piezo element and is formed in a sheet shape. The detection device 51 is formed in a longitudinal rectangular shape in plan view in a state before it is incorporated into the pointer 1.

As shown in FIGS. 5 and 6, the detection device 51 is disposed along the inner surface of the exterior housing 6 so as to be curved in the longitudinal direction.

By means of this structure, when a state of pointer 1 is switched from a leaving state where the pointer 1 is put on top of a desk or the like and an external force is not applied to the exterior housing 6 to a holding state where the exterior housing 6 is held by the user, the position of the detection device 51 is changed as a consequence of the flexure of the exterior housing, the detection device 51 outputs a voltage as a displacement signal during detecting the displacement (change in position).

As shown in FIGS. 5 and 6, the signal outputter 52 is connected to one of the short sides of the detection device 51 formed in a longitudinal rectangular shape in plan view.

The signal outputter 52 includes: a circuit device that processes a displacement signal output from the detection device 51; and a circuit substrate on which this circuit device is mounted. The signal outputter 52 is connected to the circuit unit 42 via a flexible substrate 52F.

The signal outputter 52 carries out determination of the voltage (displacement signal) output from the detection device 51 and outputs a detection signal to the controller 421.

That is, in the case where the voltage (displacement signal) output from the detection device 51 is greater than or equal to the voltage corresponding to the displacement when the exterior housing 6 is held by the user, the signal outputter 52 outputs a detection signal. In the case where the voltage (displacement signal) is less than the voltage corresponding to the displacement, the signal outputter 52 does not output a detection signal.

Operation of the controller 421 based on the detection signal will be described later.

The support frame 44 supports the pressure detector 41 and the circuit unit 42. The support frame 44 and the elastic member 45 maintain a state where the detection device 51 is located along the inner surface of the exterior housing 6.

The elastic member 45 is formed of a formed member or the like obtained by forming a synthetic resin material or the like and is formed in formed in a rectangular plate shape in plan view before being incorporated into the pointer 1.

As shown in FIG. 6, the elastic member 45 is stacked on a surface of the detection device 51 which is on the opposite side of the inner surface of the exterior housing 6, that is, on the inner face side of the curved detection device 51 so as to be located along the detection device 51.

The support frame 44 is made of a synthetic resin material and has a curved surface 441 located on the inner face side of the elastic member 45 as shown in FIG. 6.

The curved surface 441 has a curved surface located along the inner surface of the elastic member 45 provided on the inner surface of the exterior housing 6, and the curved surface is stacked on the inner surface of the elastic member 45.

The curved surface 441 supports a surface of the elastic member 45 which is on the opposite side of the detection device 51.

The detection device 51 is disposed between the elastic member 45 supported by the curved surface 441 and the exterior housing 6, and a state is maintained where the detection device 51 is located along the inner surface of the exterior housing 6.

The elastic member 45 has elasticity such that the position of the detection device 51 changes as a consequence of the exterior housing 6 in the leaving state and the holding state.

(Configuration of Exterior Housing)

Here, the exterior housing 6 will be particularly described.

As shown in FIGS. 2 and 3, the exterior housing 6 includes a housing body 60, a frame 64, and a battery cover 65.

As shown in FIG. 2, the housing body 60 extends in the first direction D1 and includes the first housing 61, the second housing 62, and third housing 63.

As shown in FIGS. 3 and 6, the housing body 60 is formed in a circular shape so as to surround the pressure detector 41, the support frame 44, and the detector 5, or the like as seen from in the first direction D1.

Specifically, the first housing 61, the second housing 62, and the third housing 63 are arranged in an annular shape in the circumferential direction so as to surround the detector 5 or the like as seen from in the first direction D1 and are arranged so that the second housing 62 is located at the upper side of the pointer 1.

The first housing 61 and the third housing 63 are arranged adjacent to both sides of the second housing 62. The boundary between the first housing 61 and the third housing 63 is located at the lower side of the pointer 1.

In other words, the first housing 61, the second housing 62, and the third housing 63, the first housing 61 and the second housing 62 are arranged adjacent to each other, and the third housing 63 that is arranged adjacent to the second housing 62 on an opposite side of the first housing 61.

The frame 64 is disposed at the front side of the first housing 61, the second housing 62, and the third housing 63.

The frame 64 is formed so as to seal the front side end at which the first housing 61, the second housing 62, and the third housing 63 are assembled and open. The frame 64 has a hole into which the connection member 411 of the pressure detector 41 is to be inserted.

A screw is inserted through the frame 64 from the front side, the frame 64 is fixed to the support frame 44 by a screw, and the screw is hidden by the pointer tip 2 when the pointer tip 2 is connected to the frame 64.

As shown in FIG. 3, an opening 6A at which the battery 43 is attachable and detachable is provided at the position of the lower side of the pointer 1 at the first housing 61 and the third housing 63.

The battery cover 65 is configured to be attachable to and detachable from the first housing 61 and the third housing 63 and cover the opening 6A of the first housing 61 and the third housing 63 in which the battery 43 is accommodated.

The first housing 61, the second housing 62, and the third housing 63 will be particularly described.

As shown in FIG. 6, on the region where the detection device 51 is provided, the lengths of the first housing 61 and the third housing 63 in the circumferential direction is longer than that of the second housing 62 in the circumferential direction.

As shown in FIG. 3, a bloated portion 621, and openings 62g and 62s, through which the aforementioned light guide 423g and the operation button 424s are to be exposed, respectively, are formed on the second housing 62 located at the position of the upper side of the pointer 1.

The bloated portion 621 is provided near the back side end of the second housing 62, improves designability of the pointer 1, and also has a function of limiting the pointer 1 from rolling when the pointer 1 is put on top of a desk or the like.

Figure 7:
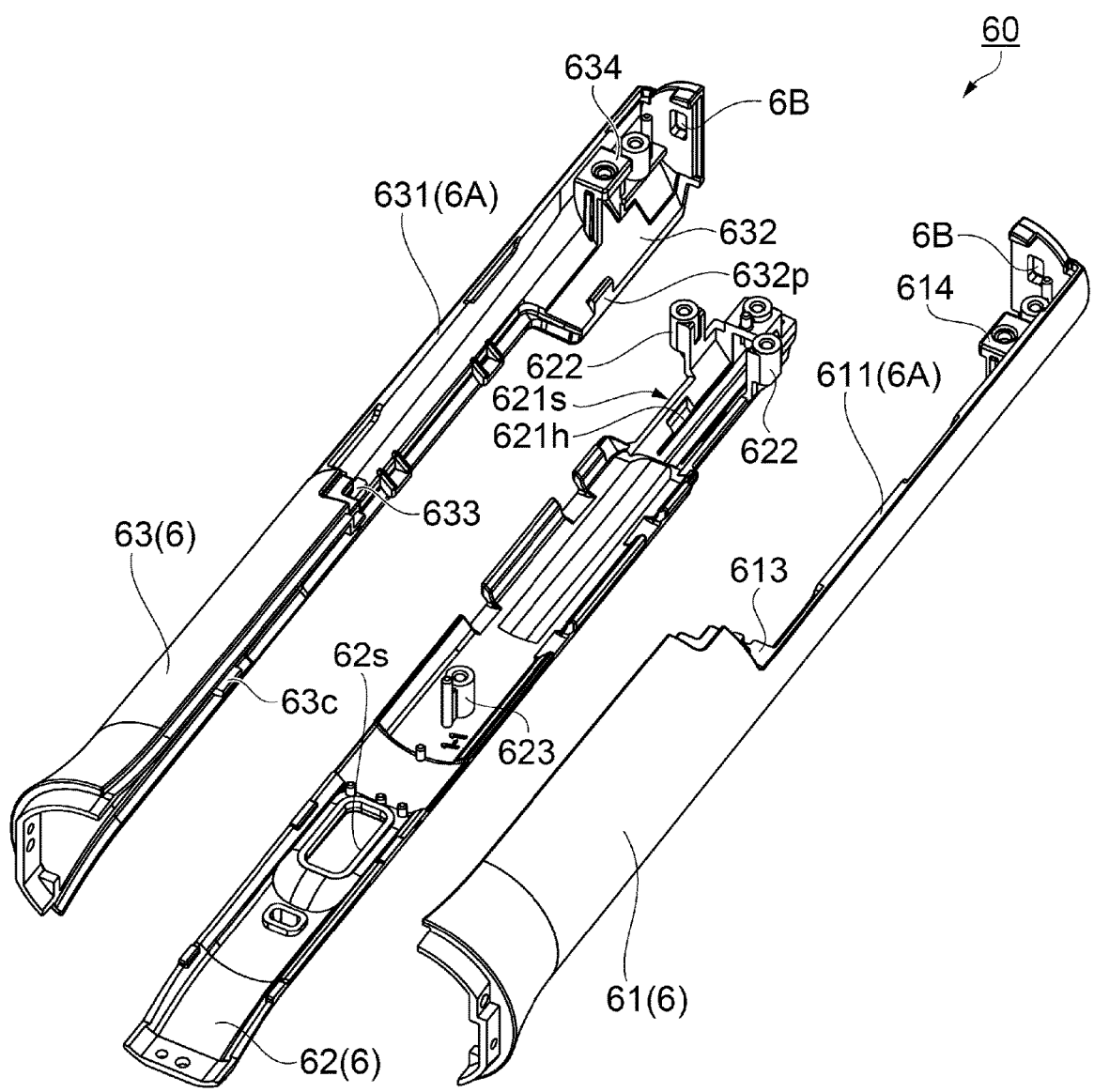
FIG. 7 is an exploded perspective view showing a first housing, a second housing and a third housing according to the embodiment.

FIG. 7 is a perspective view showing the exploded housing body 60 as seen from the lower side.

As shown in FIG. 7, the above-mentioned opening 6A is formed of a cutout 611 provided on the first housing 61 and a cutout 631 provided on the third housing 63.

Each of the first housing 61 and the third housing 63 has a wall that forms a back side surface of the exterior housing 6, and an opening 6B to which a strap is to be attached is provided on each wall.

The first housing 61, the second housing 62, and the third housing 63 are fixed by a screw at approximately three points in the first direction D1.

Particularly, the first housing 61, the second housing 62, and the third housing 63, are fixed by screws to the support frame 44 at a first position close to the front side end, a second position close to the front side of the opening 6A, and a third position close to the back side end, respectively, in the first direction D1.

Firstly, a screw fixation structure of the first position will be described.

As shown in FIG. 3, the first housing 61, the second housing 62, and the third housing 63 include stepped portions 61f, 62f, and 63f, respectively. In each stepped portion, the edge of the front side is depressed to the inside thereof:

A positioning hole and a screw insertion hole are formed on each of the stepped portions 61f, 62f, and 63f.

Protruding portions and threaded holes (not shown in figure) which correspond to the positioning holes and the screw insertion holes of the stepped portions 61f, 62f, and 63f are provided on the support frame 44.

The protruding portions of the support frame 44 are inserted into the positioning holes of the stepped portions 61f, 62f, and 63f, and the screws that are inserted through the screw insertion holes of the stepped portions 61f, 62f and 63f are inserted into the threaded holes of the support frame 44, the first housing 61, the second housing 62, and the third housing 63 are fixed to the support frame 44 by screws at the first position.

Particularly, in a state where the first housing 61, the second housing 62, and the third housing 63 are fixed to the support frame 44 by screws, the frame 64 is fixed to the support frame 44 by inserting screws through the front side thereto as described above.

Next, a screw fixation structure of the second position will be described.

As shown in FIG. 3, a projecting portion 613 having a screw insertion hole is formed at the front side edge of the cutout 611 of the first housing 61.

Similarly, as shown in FIG. 7, a projecting portion 633 having a screw insertion hole is formed at the front side edge of the cutout 631 of the third housing 63.

As shown in FIG. 7, a cylindrical boss 623 having a threaded hole is provided on the inner face side of the second housing 62 on the back side of the opening 62s.

A screw insertion hole corresponding to the threaded hole of the boss 623 and threaded holes corresponding to the screw insertion holes of the projecting portions 613 and 633, which are not shown in figure, are formed on the support frame 44.

In the configuration of the fixation structure of the first housing 61, the second housing 62, and the third housing 63 at the second position, the first housing 61 and the third housing 63 are fixed by screws to the support frame 44 that is fixed to the second housing 62 by screws.

Specifically, a screw that is inserted through the screw insertion hole is inserted into the threaded hole of the boss 623, and the support frame 44 is thereby fixed to the second housing 62. Screws that are inserted through the screw insertion holes of the projecting portions 613 and 633 are inserted into the threaded holes of the support frame 44, and the first housing 61 and the third housing 63 are thereby fixed to the support frame 44.

Next, a screw fixation structure of the third position will be described.

As shown in FIG. 3, the aforementioned bloated portion 621 is formed in the first direction D1, and the second housing 62 includes inclined surfaces 621s provided on both sides of the bloated portion 621.

As shown in FIGS. 3 and 7, a rectangular-shaped hole 621h is formed on each inclined surface 621s. A cylindrical boss 622 having a threaded hole is provided at an end of each inclined surface 621s.

Inclined portions 612 and 632, which overlap the external side of the inclined surface 621s of the second housing 62, are formed on the first housing 61 and the third housing 63, respectively.

Engagement protrusions 612p and 632p to be engaged with the holes 621h of the second housing 62 are formed on the inner face side of the inclined portions 612 and 632, respectively.

As shown in FIG. 5, a projecting portion 614 which is located at the lower side of one of the bosses 622 of the second housing 62 and has a screw insertion hole is formed on the first housing 61.

Similarly, as shown in FIG. 7, a projecting portion 634 which is located at the lower side of the other of the bosses 622 of the second housing 62 and has a screw insertion hole is formed on the third housing 63.

In the configuration of the fixation structure of the first housing 61, the second housing 62, and the third housing 63 at the third position, the first housing 61 and the third housing 63 are fixed to the second housing 62.

Specifically, the engagement protrusions 612p and 632p are engaged with the holes 621h of the second housing 62, respectively, screws that are inserted through the screw insertion holes of the projecting portions 614 and 634 are inserted into the threaded holes of the boss 622, and the first housing 61 and the third housing 63 are thereby fixed to the second housing 62.

As mentioned above, by use of the support frame 44, the first housing 61, the second housing 62, and the third housing 63 are fixed to each other by screws at approximately three points in the first direction D1.

The detector 5 is located at the position close to the second position and between the first position and the second position in the first direction D1.

The detection device 51 is positioned in the circumferential direction on the inner surface of the housing body 60.

Next, the engagement structure of the first housing 61, the second housing 62, and the third housing 63 in the region between the first position and the second position in the circumferential direction will be described.

As shown in FIG. 6, the first housing 61, the second housing 62, and the third housing 63 are formed so that ends of the first housing 61 and the third housing 63 overlap the ends located at both sides of the second housing 62 in the region between the first position and the second position.

Particularly, the ends located at both sides of the second housing 62 in the circumferential direction are formed so that the outer side thereof is depressed, the first housing 61 has a stacked portion 61a that overlaps the depressed portion of the second housing 62, and the third housing 63 has a stacked portion 63a that overlaps the depressed portion of the second housing 62.

As shown in FIG. 5, a rib 61c that protrudes toward the inside of the end of the second housing 62 is provided on the first housing 61.

As shown in FIG. 7, a rib 63c that protrudes toward the inside of the second housing 62 is provided on the third housing 63.

The ribs 61c and 63c are provided at the front side of the detector 5 in the first direction D1 and come into contact with the ends of both sides of the second housing 62.

As stated above, the second housing 62 is disposed so that both sides of the second housing 62 in the circumferential direction are sandwiched between the stacked portions 61a and 63a and between the ribs 61c and 63c.

As shown in FIG. 6, the first housing 61 and the third housing 63 are formed so that end of the first housing 61 overlaps the end of the third housing 63 at the outside.

Particularly, the outer side of the end of the third housing 63 which is close to the first housing 61 is depressed, and the first housing 61 has a stacked portion 61d that overlaps the depressed portion of the third housing 63.

As shown in FIGS. 5 and 6, a rib 61e that protrudes toward the inner surface of the third housing 63 is formed on the inner surface of the end of the first housing 61 which is close to the third housing 63.

As described above, the first housing 61 and the third housing 63 are disposed so that the end of the third housing 63 is sandwiched between the stacked portion 61d and the rib 61e.

As described above, the first housing 61, the second housing 62, and the third housing 63 are fixed by screws at three points (first position, second position, and third position) in the first direction D1 and are arranged so that the ends are partially fitted into each other between the first position and the second position in the circumferential direction.

As shown in FIG. 6, the detection device 51 is provided so as to overlap the first housing 61 and the second housing 62 and so as to overlap the second housing 62 and the third housing 63.

The curved surface 441 of the support frame 44 as well as the elastic member 45 are provided so as to overlap the first housing 61, and the second housing 62 and so as to overlap the second housing 62 and the third housing 63.

As stated above, the detection device 51 is separated from the position at which the first housing 61, the second housing 62, and the third housing 63 are fixed by screws, and is provided so as to overlap three housings (the first housing 61, the second housing 62, and the third housing 63).

Accordingly, when the pointer 1 is held, flexure generated from the first housing 61, the second housing 62, and the third housing 63 is effectively transmitted to the detection device 51. The position of the detection device 51 is changed as a consequence of the flexure generated from the first housing 61, the second housing 62, and the third housing 63.

As shown in FIG. 6, the area 51A in which the detection device 51 is provided in the circumferential direction is a region having degrees greater than 180° with respect to a central axis of the pointer. In the embodiment, the detection device 51 is provided in the region having degrees of approximately 220°. In other words, in the cross-sectional view, in the region in which the detection device 51 is provided, an angle between: the line connecting one end (first end) of the detection device 51 which is in contact with the inner surface of the third housing 63 and the center of the pointer 1; and the line connecting the other end (second end) of the detection device 51 which is in contact with the inner surface of the first housing 61 and the center of the pointer 1 is greater than 180°. In the embodiment, the angle is approximately 220°.

Furthermore, the detection device Si is located in the center region of the pointer 1 in the first direction D1.

Particularly, the pointer 1 has three regions which are obtained by dividing the pointer 1 into three equal parts, and the detection device 51 is provided in a center region of the three regions in the first direction D1.

(Operation of Controller)

The controller 421 changes a state of the pointer 1 in accordance with a detection signal output from the detector 5.

Here, operation of the controller 421 in accordance with a detection signal will be described.

Figure 8:
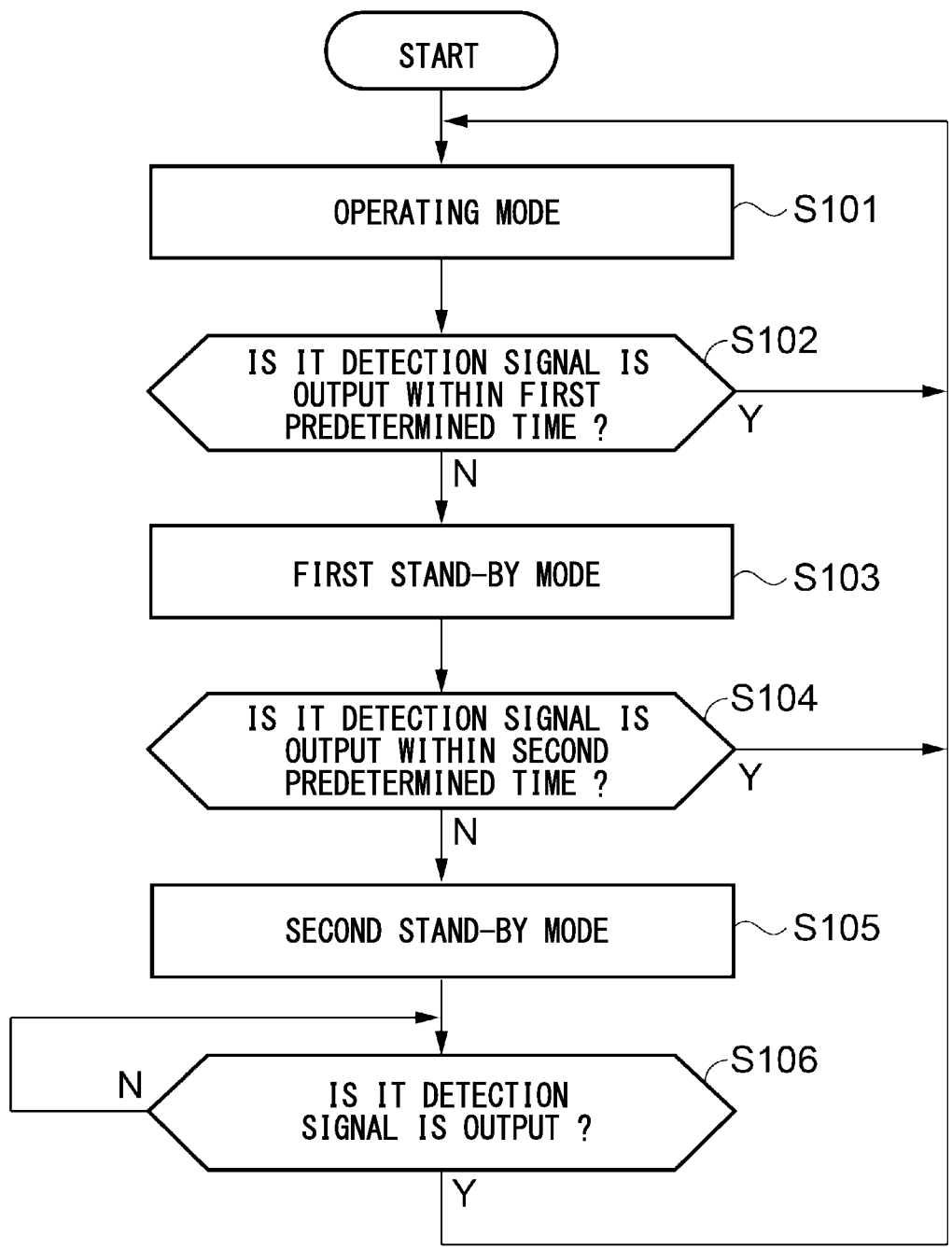
FIG. 8 is a flowchart showing operation of a controller according to the embodiment.

FIG. 8 is a flowchart showing operation of the controller 421.

When the battery 43 is attached to the pointer 1, the power is turned on, the controller 421 is in an operating mode (step S101) in which it is possible to control the pointer 1 under various control.

In the operating mode, the controller 421 determines whether or not a detection signal is output within a first predetermined time (for example, 15 seconds) (step S102). In the case where the detection signal is not output, it is switched to step S103. In the case where the detection signal is output, the operating mode (step S101) continues.

That is, in the case where a state where the detection signal is not output continues for the first predetermined time, it is switched to step S103 by the controller 421. In the case where the detection signal is output before elapsing the first predetermined time, it is switched to step S101.

In step S103, the controller 421 changes a state of the pointer 1 from the operating mode to the first stand-by mode.

That is, in the case where the detection signal is not output for a first predetermined time in the operating mode, it is determined that the pointer 1 is not held by the user in this period, the controller 421 changes a mode of the pointer 1 to the first stand-by mode.

In the first stand-by mode, since operation of the driver 422 is stopped, emission of light from the light emitter 3 is stopped, and power consumption becomes low.

In the first stand-by mode, the controller 421 determines whether or not a detection signal is output within a second predetermined time (for example, 15 seconds) (step S104). In the case where the detection signal is not output, it is switched to step S105. In the case where the detection signal is output, a state of the pointer 1 is switched to the operating mode (step S101).

That is, in the case where a state where the detection signal is not output continues for the second predetermined time, it is switched to step S105 by the controller 421. In the case where the detection signal is output before elapsing the second predetermined time, it is switched to step S101.

As stated above, in the case where the detection signal is output in the first stand-by mode, it is determined that the pointer 1 is held by the user, the controller 421 changes a mode of the pointer 1 to the operating mode.

In other cases, the first predetermined time may be different from the second predetermined time.

In step S105, the controller 421 changes a state of the pointer 1 from the first stand-by mode to the second stand-by mode.

That is, in the case where the detection signal is not output for a second predetermined time in the first stand-by mode, it is determined that the pointer 1 is not held by the user in this period, the controller 421 changes a mode of the pointer 1 to the second stand-by mode.

Since part of the operation carried out by the first stand-by mode is stopped in the second stand-by mode, power consumption becomes lower than the case of the first stand-by mode.

In the second stand-by mode, the controller 421 determines whether or not a detection signal is output (step S106). In the case where the detection signal is not output, the step S106 is repetitively carried out. In the case where the detection signal is output, the controller 421 changes the mode to the operating mode (step S101).

That is, in the case where the detection signal is output in the second stand-by mode, it is determined that the pointer 1 is held by the user, the controller 421 changes the mode of the pointer 1 to the operating mode.

As mentioned above, the controller 421 changes a state of the pointer 1 based on a detection signal output from the detector 5.

As described above, according to the pointer 1 according to the embodiment, it is possible to obtain the following effects.

(1) The pointer 1 includes: the detector 5 configured to detect the displacement in accordance with the flexure of the exterior housing 6 and output a detection signal, and the controller 421 that changes an operation state in accordance with the detection signal.

Accordingly, since it is possible to detect a holding state and determine whether or not it is in a leaving state, it is possible to provide the pointer 1 that changes an operation state depending on the above-mentioned states.

As a result, it is possible to provide the pointer 1 that reduces power consumption and improves operatability.

(2) The exterior housing 6 includes the housing body 60 that extends in the first direction D1, and the detection device 51 is disposed on the inner surface of the housing body 60 in the circumferential direction.

Consequently, the user can hold the housing body 60 and use the pointer like a writing instrument. Since the detection device 51 is provided inside the housing body 60 which is easily held by the user, it is possible to effectively transmit the user's force for holding the pointer to the detection device 51.

Accordingly, the pointer 1 can effectively detect a holding state.

(3) The detection device 51 is provided so as to overlap the first housing 61 and the second housing 62 and so as to overlap the second housing 62 and the third housing 63.

Consequently, the exterior housing 6 is effectively bent due to the holding of the pointer by the user, and the detection device 51 can effectively detect the displacement in accordance with the flexure.

Accordingly, it is possible to further improve the operatability of the pointer 1.

(4) The first housing 61, the second housing 62, and the third housing 63 are annularly arranged in the circumferential direction. The first housing 61 and the third housing 63 are arranged adjacent to both sides of the second housing 62.

The display 423 and the operation unit 424 are disposed on the second housing 62.

Accordingly, it is possible to allow the user to hold the first housing 61 and the third housing 63.

Since the detection device 51 is provided so as to overlap the first housing 61 and the second housing 62 and so as to overlap the second housing 62 and the third housing 63, it is possible to allow the user to hold the portion at which the exterior housing 6 effectively bends.

Accordingly, the exterior housing 6 is effectively bent, and the detection device 51 can effectively detect the displacement in accordance with the flexure.

(5) The detection device 51 is provided in a region having degrees greater than 180° along the circumferential direction with respect to a central axis of the pointer.

Since it is thought that the user holds the portions facing each other of the exterior housing 6 in the circumferential direction, the flexure of the exterior housing 6 is reliably transmitted to the detection device 51, and it is possible to allow the detection device 51 to detect the displacement in accordance with the amount of flexure.

(6) The pointer 1 has three regions which are obtained by dividing the pointer 1 into three equal parts, and the detection device 51 is provided in the center region of the three regions in the first direction D1.

Accordingly, it is possible to detect a holding state in the case where the user holds the center portion and in the case where the user holds the front side of the center portion or the back side of the center portion.

Accordingly, it is possible to provide the pointer 1 that changes an operation state and improves flexibility in the position at which the user holds the pointer 1 in the first direction D1.

(7) The elastic member 45 and the support frame 44 are provided in this order on the surface of the detection device 51 on the opposite side of the inner surface of the exterior housing 6.

Because of this, a state is maintained in which the detection device 51 is located along the inner surface of the exterior housing 6, and it is possible to change the position of the detection device 51 as a consequence of the flexure of the exterior housing 6.

Accordingly, it is possible to realize the arrangement of the detection device 51 which sensitively detects the displacement in accordance with the flexure of the exterior housing 6.

(8) Since the pointer 1 includes the first stand-by mode of stopping the operation of the driver 422, it is possible to reduce power consumption.

In the operating mode, the driver 422 causes the light emitter 3 to normally emit light in a first emitting optical pattern or a second emitting optical pattern. Therefore, as a result of switching from the operating mode to the first stand-by mode, it is possible to significantly obtain the effect of reducing the power consumption.

In the operating mode, in the case where the detection signal is not output for a first predetermined time, the controller 421 switches the operating mode to the first stand-by mode.

Even in the case where the pointer tip 2 is not being pressed or the operation unit 424 is not being operated, the pointer 1 can detects that the pointer 1 is held by the user.

Particularly, the pointer 1 can detect a state where the pointer is not being reliably used, and in the case where the time for which the pointer is not being reliably used reaches the first predetermined time, the pointer turns into first stand-by mode.

Accordingly, even where the first predetermined time is shortened such that the first predetermined time is set to 15 seconds as described in the embodiment, it is possible to prevent the operatability of the pointer from being degraded.

Accordingly, it is possible to further reduce power consumption of the pointer 1.

(9) Since the pointer 1 further includes the second stand-by mode of stopping part of the operation carried out by the first stand-by mode, it is possible to further reduce power consumption.

In the first stand-by mode, in the case where a detection signal is not output for a second predetermined time, the controller 421 switches the first stand-by mode to the second stand-by mode.

For this reason, since the pointer 1 can detect a state where the pointer is not being reliably used, even where the second predetermined time is shortened, it is possible to prevent the operatability of the pointer from being degraded.

Accordingly, it is possible to further reduce power consumption of the pointer 1.

(10) In the first stand-by mode and the second stand-by mode, in the case where a detection signal is output, the controller 421 switches the stand-by mode to the operating mode.

Consequently, when the user holds the pointer 1 in the first stand-by mode and the second stand-by mode, the pointer 1 can turn into the operating mode without carrying out other operation.

Accordingly, it is possible to provide the pointer 1 that can realize improvement in operatability and can shorten the time until the pointer can carry out a drawing operation or the like.

Modified Example

Particularly, the above-described embodiment may be modified as follows.

The housing body 60 according to the embodiment is configured to include three housings (the first housing 61, the second housing 62, and the third housing 63) which are adjacently arranged in the circumferential direction; however, the housing body may be configured to include four or more housings which are adjacently arranged in the circumferential direction.

In this case, the detection device 51 may be configured to be provided so as to overlap inner surfaces of the four or more housings.

Alternatively, the housing body 60 may be configured to include two or less housings.

The detection device 51 according to the above-described embodiment is provided so as to overlap inner surfaces of three housings (the first housing 61, the second housing 62, and the third housing 63); however, the detection device 51 may be configured to be arranged on the inner surfaces of two or one housings of the three housings.

The housing body may be formed by two housings arranged in the circumferential direction, and the detection device 51 may be configured to be arranged on the inner surface of any one of the two housings.

In the above-described embodiment, the housing body 60 is formed in a circular shape so as to surround the detector 5 or the like; however, the housing body 60 may be formed in a polygonal shape.

The external form of the housing body 60 may be formed in a polygonal shape, and the inner surface of the housing body 60 may be formed in a circular shape.

In the housing forming the housing body, a portion may be formed which is different form the end of the housing and has a wall thickness partially becoming thin. In this case, the detection device may be provided so as to overlap both sides of the portion.

Consequently, even in the case of reducing the number of housing forming the housing body, it is possible to realize the configuration in which the amount of flexure corresponding to the displacement that is effectively detectable by the detection device is obtained.

The detection device 51 according to the above-described embodiment is configured so that a state where the detection device 51 is located along the inner surface of the exterior housing 6 is maintained by use of the elastic member 45; however, the detection device 51 may be configured to be disposed on the inner surface of the exterior housing 6 with a pressure-sensitive adhesive interposed therebetween.

In the pointer 1 according to the above-described embodiment, the display 423 and the operation unit 424 are disposed in the second housing 62; however, only any one of the display 423 and the operation unit 424 may be disposed in the second housing, and both the display 423 and the operation unit 424 may not be disposed in the second housing.

The pointer 1 according to the above-described embodiment includes one detector 5; however, the invention is not limited to a single detector, a structure in which a plurality of detectors are provided may be adopted.

For example, in the configuration two detectors are arranged in the first direction D1, the pointer may be configured so that various operations may be carried out depending on a detection signal that is output from each detector.

In this configuration, the pointer may be configured so that an external appearance (color, surface roughness, or the like) of the exterior housing varies depending on the arrangement of two detectors.

Consequently, it is possible to clarify the position which is to be held by the user in order to carry out various operations by the user.

The pressure detector 41 according to the above-described embodiment is configured to detect that the pointer tip 2 is pressed due to change in a connecting state; however, the invention is not limited to this.

For example, a pressure detector may be configured to include a piezo element, a strain gauge, or the like, and detect displacement of the pointer tip 2.

The pointer 1 according to the above-described embodiment includes two stand-by modes (the first stand-by mode and the second stand-by mode); however, the pointer may be configured to include one stand-by mode or three or more stand-by modes.

In the above-described embodiment, the light emitter 3 that emits infrared light is used as a transmitter; however, a device that emits light having a wavelength band different from that of the infrared light or ultrasonic may be used as a transmitter.

In the above-described embodiment, an aspect of the pointer 1 is described which used in the display system 10 including the projector 20 that projects an image on the front surface side of the projection surface SC; however, the pointer may be used in a display system other than the above-described system.

For example, a rear type projector that projects an image from the back surface side of the projection surface is used, and the pointer 1 may be configured to be used to point the projection surface serving as an operation surface. A liquid crystal display, a CRT (Cathode Ray Tube), a plasma display, an organic EL display, or the like is used instead of the projection surface on which an image to be projected, and the pointer 1 may be configured to be used to point a display surface of such device which serves as an operation surface.

The pointer 1 according to the above-described embodiment is formed in a shape which is similar to a writing instrument; however, as long as the pointer is formed so that the user can hold the pointer and the pointer can point a desired position, the shape of the pointer is not limited to the shape similar to the writing instrument.

Figure 9:
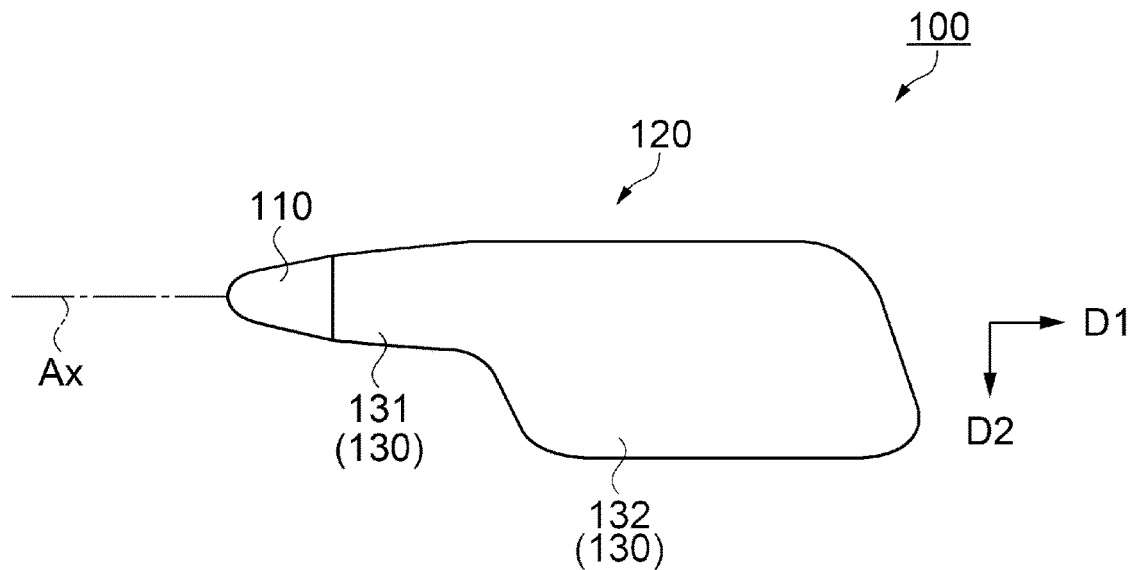
FIG. 9 is a view schematically showing an external appearance of a pointer according to a modified example.

For example, the pointer 1 may be formed in a shape shown in FIG. 9.

FIG. 9 is a view schematically showing an external appearance of a pointer 100 according to a modified example.

The pointer 100 includes a pointer tip 110 and a main body 120 to which the pointer tip 110 is connected.

The main body 120 includes an exterior housing 130. The exterior housing 130 includes: a frame 131 that follows the external form of the pointer tip 110; and a holding portion 132 that protrudes from the frame 131 in a second direction D2 intersecting with the central axis Ax (the first direction D1)) of the pointer tip 110 and is to be held by the user.

Figure 10:
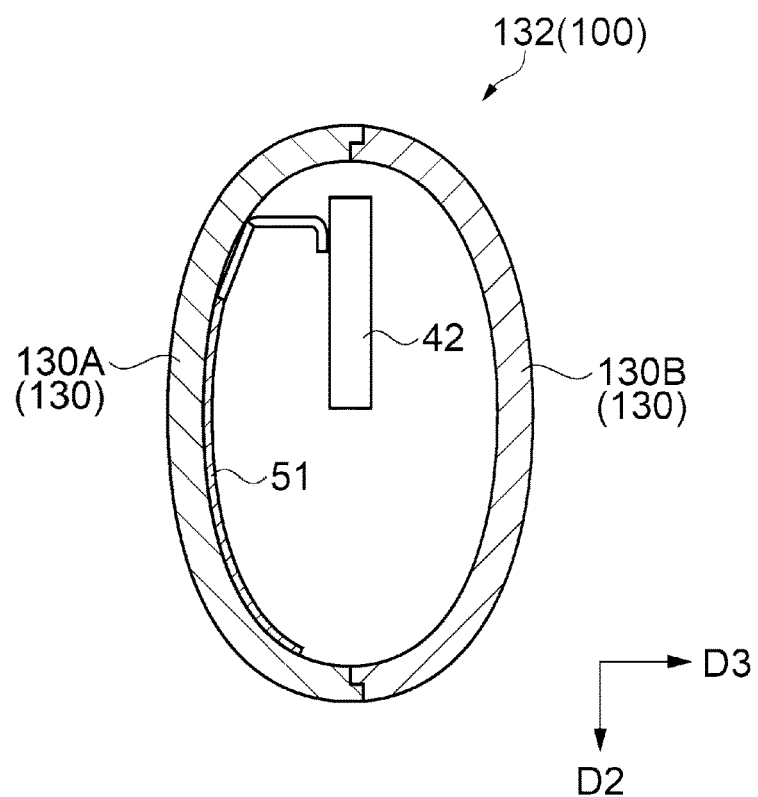
FIG. 10 is a cross-sectional view schematically showing a holding portion according to the modified example.

FIG. 10 is a cross-sectional view schematically showing the holding portion 132 of the pointer 100.

As shown in FIG. 10, the holding portion 132 is formed so that the external dimensions in a third direction D3 that intersects with the first direction D1 and the second direction D2 is smaller than the external dimensions in the second direction D2. The holding portion 132 is formed of a first holder housing 130A and a second holder housing 130B which faces each other in the third direction D3.

The detection device 51 is disposed along the inner surface of the first holder housing 130A.

As mentioned above, the detection device 51 may be configured to be disposed and formed in a flat shape or a shape similar to a flat shape without being bent, and the detection device 51 is configured to detect displacement of the first holder housing 130A.

The pointer 100 can carry out the operation similarly to that of the pointer 1 according to the above-described embodiment.

While preferred embodiments and modified example of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A pointer comprising:
a pointer tip having a tip configured to point a position;
a transmitter configured to emit a signal from the pointer tip; and
a main body connected to the pointer tip, the main body comprising: an exterior housing forming an exterior, a detector configured to detect displacement of the exterior housing and output a detection signal, and a controller configured to change an operation state of the pointer in accordance with the detection signal, the detector comprising: a detection device provided on an inner surface of the exterior housing and configured to detect the displacement, and a circuit that outputs the detection signal in the case where the detection device detects the displacement;
an elastic member stacked on a surface of the detection device which is on an opposite side of the inner surface of the exterior housing; and
a support frame configured to support the elastic member on an opposite side of the detection device.

2. A pointer comprising:
a pointer tip having a tip configured to point a position;
a transmitter configured to emit a signal from the pointer tip; and
a main body connected to the pointer tip, the main body comprising: an exterior housing forming an exterior, a detector configured to detect displacement of the exterior housing and output a detection signal, and a controller configured to change an operation state of the pointer in accordance with the detection signal, the detector comprising: a detection device provided on an inner surface of the exterior housing and configured to detect the displacement, and a circuit that outputs the detection signal in the case where the detection device detects the displacement, wherein
the exterior housing comprises a housing body that extends in a first direction from the tip to an opposite side of the tip and surrounds the detector as seen in the first direction, and
the detection device is arranged on an inner surface of the housing body in a circumferential direction of the housing body.

3. The pointer according to claim 2, wherein
the housing body comprises a first housing and a second housing which are arranged adjacent to each other in the circumferential direction, and
the detection device is provided so as to overlap the first housing and the second housing.

4. The pointer according to claim 3, wherein, the housing body comprises a third housing that is arranged adjacent to the second housing on an opposite side of the first housing in the circumferential direction, and the detection device is provided so as to overlap the second housing and the third housing.

5. The pointer according to claim 4, wherein the first housing, the second housing, and the third housing are annularly arranged in the circumferential direction, and at least one of: a display that is configured to display information associated with the pointer, and an operation unit that is to be operated by a user, is arranged in the second housing.

6. The pointer according to claim 2, wherein the detection device is provided in a region having degrees greater than 180° along the circumferential direction with respect to a central axis of the pointer.

7. The pointer according to claim 2, wherein the pointer includes three regions which are obtained by dividing the pointer into three equal parts in the first direction, and the detection device is provided in a center region of the three regions.

8. The pointer according to claim 1, further comprising:

a driver configured to drive the transmitter, wherein the pointer includes: an operating mode of enabling the driver to drive by the controller, and a first stand-by mode of stopping operation of the driver by the controller.

9. The pointer according to claim 8, wherein in the case where the detection signal is output in the first stand-by mode, the controller changes the first stand-by mode to the operating mode.

10. The pointer according to claim 8, wherein in the case where a state where the detection signal is not output continues for a first predetermined time in the operating mode, the controller changes the operating mode to the first stand-by mode.

11. The pointer according to claim 8, wherein the pointer includes a second stand-by mode of stopping part of the operation carried out in the first stand-by mode by the controller.

12. The pointer according to claim 11, wherein in the case where a state where the detection signal is not output continues for a second predetermined time in the first stand-by mode, the controller changes the first stand-by mode to the second stand-by mode.

13. The pointer according to claim 11, wherein in the case where the detection signal is output in the second stand-by mode, the controller changes the second stand-by mode to the operating mode.

* * * * *